United States Patent [19]

Asano

[11] Patent Number: 4,633,745

[45] Date of Patent: Jan. 6, 1987

[54] APPARATUS FOR TRIMMING ARTICLES MOLDINGLY FORMED ON PLASTIC SHEET

[75] Inventor: Kazuo Asano, Nagoya, Japan

[73] Assignee: Kabushiki Kaisha Asano Kenkyusho, Nagoya, Japan

[21] Appl. No.: 765,996

[22] Filed: Aug. 15, 1985

[30] Foreign Application Priority Data

Aug. 22, 1984 [JP] Japan ............................... 59-174500

[51] Int. Cl.$^4$ ............................................. B26D 11/00
[52] U.S. Cl. ........................................ 83/455; 83/214; 83/217; 83/519; 83/614; 83/914
[58] Field of Search ......................... 83/104, 566-570, 83/614, 513, 519, 925 R, 409, 563, 455, 214, 217, 216, 914; 425/307, 306

[56] References Cited

U.S. PATENT DOCUMENTS 3,461,761  8/1969  Mojonnies ...................... 83/567 X
3,685,251  8/1972  Mahaffy ......................... 83/466 X

FOREIGN PATENT DOCUMENTS 1511723  8/1969  Fed. Rep. of Germany ........ 83/569

Primary Examiner—James M. Meister
Attorney, Agent, or Firm—Jordan and Hamburg

[57] ABSTRACT

Apparatus for longitudinally and transversely trimming articles moldingly formed on plastic sheet which is brought by means of a pair of clamp chains between longitudinally movable pointed tip knives and longitudinally extended holder members as well as transversely movable pointed tip knives and transversely extended holder member respectively held in retracted position and then trimmed by moving said knives and holder members to forwarded position and by moving said knives. Said sheet is formed in advance with transversely and longitudinally extended ridges so that said moving knives cannot sever the sheet at said ridges, whereby trimmed articles fall down by gravity and waste portion kept in one piece is brought out by said clamp chains to be collected. In order to attain correct trimming, said sheet is formed in advance further with additional transversely and longitudinally extended ridges respectively beside and in parallel with lines to be severed so that each rib mounted beside the concerned knife and extended in parallel with the knife moving direction fits in the concerned additional ridge of the sheet from the reverse side.

2 Claims, 11 Drawing Figures

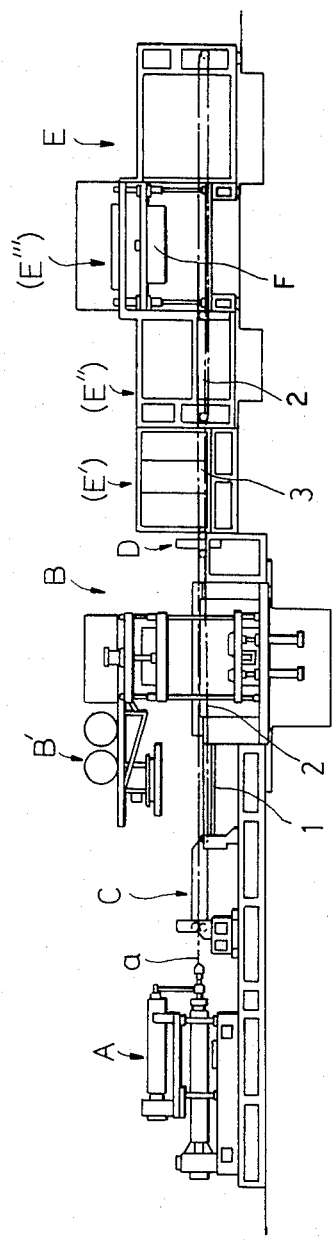
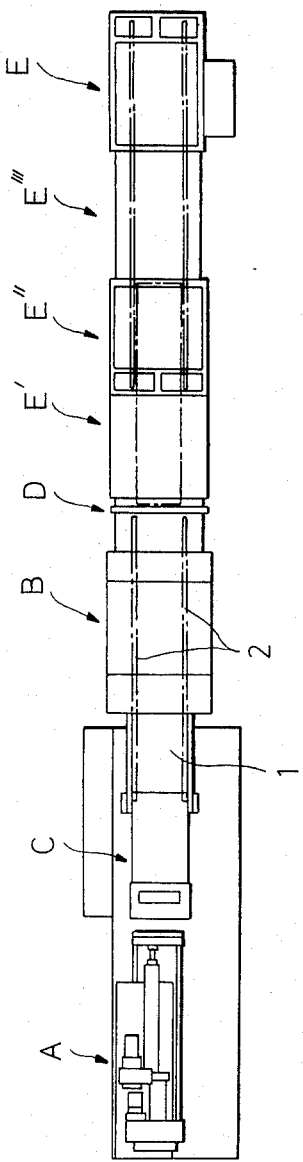
Fig.1
Fig.2

APPARATUS FOR TRIMMING ARTICLES MOLDINGLY FORMED ON PLASTIC SHEET

BACKGROUND OF THE INVENTION AND RELATED ART

The present invention relates to an improvement of the apparatus for longitudinally and transversely trimming articles moldingly formed on the plastic sheet as disclosed in the copending application Ser. No. 642,980.

Various articles are formed by feeding a heated and softened thermoplastic web between a pair of male and female dies which are normally separated and by bringing said dies engaged together. Said dies may be subjected to raised or reduced pressure as occasion demands. Rectangular articles such as bath tubs, refrigerator inner rooms and the like have been manufactured according to such method. For instance, the freezing room and the cooling room of the refrigerator, the former being smaller in general than the latter, are preferably formed by one shot of the forming machine operation for the convenience of assembly.

Unnecessary portion of the plastic sheet surrounding the fomred articles must be trimmed. Conventionally, a set of upper and lower frames, each comprising four or more blades so arranged as to correspond to the four or more lines of the plastic sheet to be severed have been used so that transverse and longitudinal trimmings are made in one shot by relatively moving said set of frame blades in vertical direction to engage with each other. According to such conventional trimming method, the cut-off waste portion of the plastic sheet is in one piece like as a picture frame held by a pair of clamp link chains along opposite side edges thereof so as to efficiently recover much amount of waste.

According to such conventional trimming device, however, every time when size of the article to be formed is varied, the set of trimming frame blades must be exchanged which necessitates many sets of blades of various sizes to be stored, which is space and time consuming. When the trimming device is combined with the moldingly forming machine, which is in turn usually combined with an extruder feeding plastic web thereto, so as to be intermittently operable in synchronized relation therewith, said forming machine and further said extruder if it is combined therewith must be stopped during such time consuming blade exchange work.

In order to avoid said defects, it was proposed in said copending application to provide a trimming apparatus comprising a set of longitudinally shiftable transversely movable pointed tip knives and a set of transversely shiftable longitidially movable pointed tip knives, respectively normally held in retracted position but movable to be brought in forwarded position where each pointed tip of said knives engages with the plastic sheet, said knives being so arranged that the distances between the concerned knives may be adjusted by correspondingly shifting and the plastic sheet may be trimmed by moving said knives which have been brought in said forwarded position.

It is not always necessary but actually preferable to provide a set of longitudinally shiftable transversely extended holder members and a set of transversely shiftable longitudinally extended holder members, respectively normally held in retracted position but movable so as to be brought in forwarded position where each member hold the plastic sheet along the respective line to be severed to cooperate with the respective counterpart knife, said holder members being so arranged that the distances between the concerned holder member may be adjusted by correspondingly shifting.

When the knives for longitudinal and transverse severing are separately provided, however, the waste sheet portion is to be divided in a plurality of pieces, which is not preferable by the reason referred to above.

In order to avoid such defects, it was disclosed in said copending application to provide longitudinally and transversely extending bent ridges formed on the plastic sheet concurrently with forming the articles so that said pointed knives brought in the respective forwarded position may sever the plastic sheet except said ridges to which each pointed tip of said knives cannot reach.

However, it was found difficult in such trimming apparatus to sever the sheet along the correct lines due to that the sheet is still plastic. The severed line is not only often deviated from the line to be severed but also not straight and zig-zagged or curved more or less.

SUMMARY OF THE INVENTION

The object of the invention is, thus, to provide means for assuring correct severing in a straight line mming apparatus proposed in said copending improvement of the invention by forming additional transversely and longitudinally extended ridges respectively beside and in parallel with lines to be severed on the sheet and by providing transversely and longitudinally extended rib members mounted beside each of said knives so as to be each fitted in the concerned ridge of the sheet from the reverse side, and further forming extended grooves in the surface of the transversely and longitudinally extended holder members so as to be each fitted on the concerned ridge of the sheet.

BRIEF DESCRIPTION OF THE DRAWINGS

FIG. 1 is a schematic side elevation of a line of an extruder and a moldingly forming machine with which the trimming apparatus of the invention is combined, FIG. 2 is a schematic top plan view of the above.

DESCRIPTION OF THE PREFERRED EMBODIMENT

In refference to FIGS. 1 and 2, it is explained how the trimming apparatus according to the disclosure in said copending application is combined with the conventional extruder-forming machine.

An extruder having a die for continously extruding a thermoplastic web a is generally represented by A. A forming machine represented generally by B has a pair of dies respectively movable in vertical direction by means of hydraulic or pneumatic piston-cylinder devices to be engaged for forming articles from the plastic web a fed therebetween, which is preferably provided with a heating device B'. In order to settle the discrepancy caused by continuous extruding of the plastic web which must intermittently be fed to the forming machine, there is arranged a mechanism C therebetween. Since not only said extruder A and moldingly forming machine B but also such mechanism C are in public knowledge and have no direct connection with the invention, there will be no need for further detailed explanation.

It is added only that there is provided an endless belt conveyor I so as to supply the continuously extruded plastic web a to the forming machine B. Since the upper and lower dies must be engaged together with holding said plastic web a therebetween for forming, said belt conveyor 1 can not run through the forming machine B. Thus, a pair of endless clamp link chains 2, 2 are provided so as to grip the side edges of said plastic web a to be brought into and out of said forming machine B, as well known to those skilled in the art.

At the outlet of the machine B, there is provided a cutting device D so as to cut the endlessly extending plastic web a on which articles are formed into a length of plastic sheet b to be trimmed.

Figure 5:
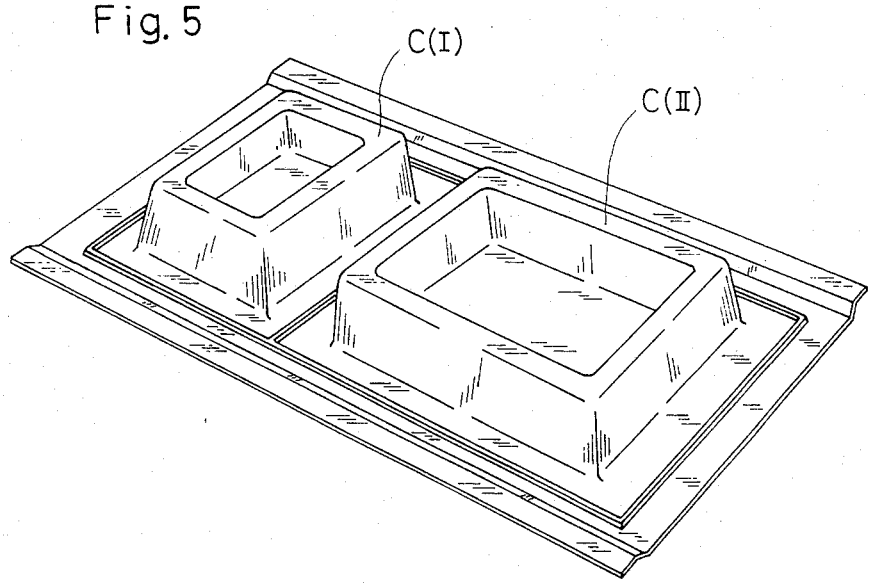
FIG. 5 is a perspective view of the plastic sheet on which two articles as well as longitudinally and transversely extending bent ridges are formed according to the invention.

The plastic sheet b formed with articles such as C(I) and C(II) shown in FIG. 5 is received by an endless belt conveyor 3 in a trimming apparatus of the invention generally represented by E.

Before the plastic sheet b on which articles are formed enters the trimming apparatus E where a set of longitudinally and transversely movably pointed tip knives as well as a set of longitudinally and transversely extended holder members are provided, it is preferably to provide a chamber (E') for cooling said sheet b, a positioning device (E''), and a boring device (E''').

When said plastic sheet b is carried by belt conveyor 3 through said cooling zone (E') into the positioning zone (E''), said conveyor 3 is stopped in response to any usual means such as limit switch signal and the position of the plastic sheet b formed with articles on the conveyor is detected and corrected in preparation for correct severing.

In response to a signal generated in any suitable manner, a pair of clamp link chains 5 are actuated to grip the sheet b along the opposite side edges thereof and driven to carry said plastic sheet b into the boring zone (E''') and stopped there. A die F having a necessary number of drills is lowered e.g. by a hydraulic device onto the articles to bore the corresponding number of holes for water drain, cooled air circulation and the like.

Then, the clamp link chains 5, 5 are driven again in response to a signal caused by e.g. a limit switch actuated by movement of said die F to carry the sheet b into the main frame of the trimming apparatus E.

Before entering detailed explanation of arrangement of the concerned members and operation thereof in the apparatus E, it will be preferable for ready understanding thereof to make brief explanations on said clamp link chains 5, 5 which are same with the endless chains 2, 2 for the forming machine B and on relationship of the longitudinally and transversly movable pointed tip knives to the transversely and longitudinally extending ridges formed on the plastic sheet.

Figure 3:
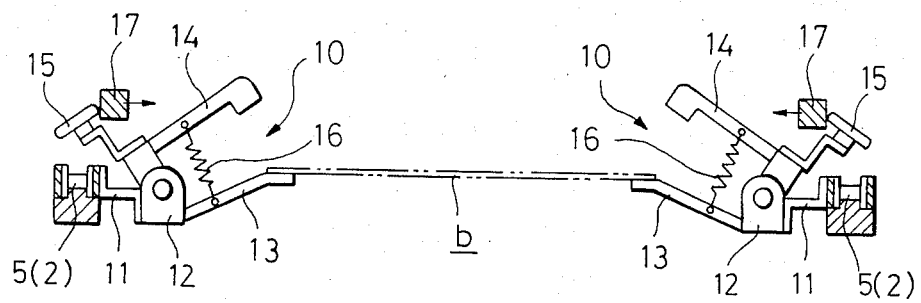
FIGS. 3 and 4 are schematic views showing a pair of clamp link chains for gripping the continosly fed plastic web at the opposite side edges thereof at the area of the moldingly forming machine and the plastic sheet cut in a specific length on which the articles are formed at the area of the trimming apparatus of the invention respectively in inactive position and clamp position.
Figure 4:
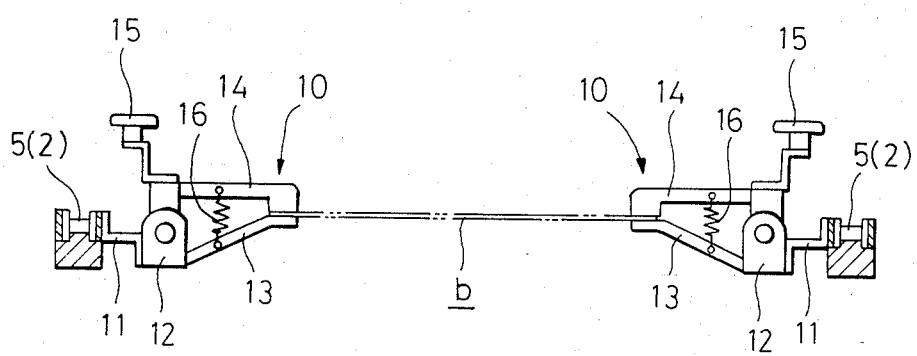

In reference to FIGS. 3 and 4, each of a pair of endless link chains 5, 5 (2, 2) is provided with a plurality of clamp means represented generally by 10. The clamp means 10 comprises a bracket 11 fixed to a link of the chain, a block member 12 fixed to said bracket 12, an arm 13 fixed to said block member 12 at the root thereof and projecting inward so that the plastic sheet b having articles formed thereon (continous plastic web a in respect of the clamp chain 2 for the forming machine B) may be held on the free end of said arm 13, and an angularly movable arm 14 pivoted on said block member 12 at the root portion thereof, and a rotatable wheel 15 of which axle is planted on said block member 12 so as to be rotated on said axle.

Said two arms 13 and 14 has a coiled spring means 16 of which ends are fixed respectively to said arms 13, 14 so that free ends thereof may grip the plastic sheet b (or web a) at the side edge thereof.

As shown in FIG. 3, however, said wheel 15 normally abuts on a rail 17 so that said pivotally movable arm 14 is kept in the open position against the force of said spring means 15. When said rail 17 is moved away in response to a signal, said movable arm 14 is pivotally moved by means of said spring means 16 to grip the plastic sheet b (or plastic web a) as shown in FIG. 4.

Now with reference to FIGS. 5, 6, 7 and 8, the plastic sheet b has articles C(I) such as freezing room casing for the refrigerator and articles (II) such as cooling room casing formed thereon. Peripheral portion surrounding said articles must be drimmed.

The plastic sheet b is to be trimmed along two longitudinal lines Xa and Xb by means of two longitudinally movable pointed tip knives, which are transversely shiftable so as to adjust the distance between said two lines.

When two articles are formed on the plastic sheet b, trimming is to be made along transverse four lines Ya, Yb, Yb' and YC by means of four transversely movable pointed tip knives, which are longitudinally shiftable so as to adjust the distances between said four lines or three lines as occasion demands where the distance between the line Yb and Yb' is fixed.

The upwardly protruded ridges to be formed for the purpose(s) as referred to above and/or of the present invention concurrently with forming articles C(I) and C(II) are illustrated by XR, XR'; $XR_1$, $XR_2$ longitudinally extending and YR, YR' and YR'' transversely extending.

Figure 7:
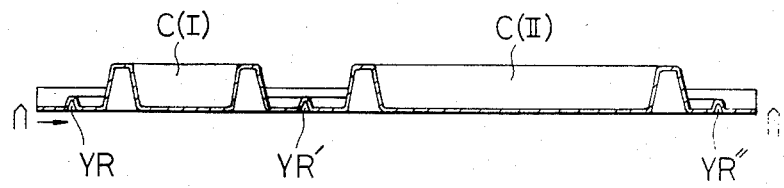
FIGS. 7 and 8 are side and end views of the above showing positional relation of the knife in the forwarded position to the bent ridges of th plastic sheet.
Figure 8:
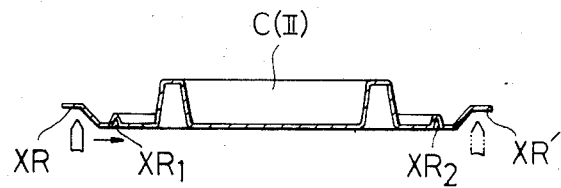

The meaning of providing such ridges is to be readily appreciated by glancing at FIGS. 7 and 8, the former being a section taken along a longitudinal center line in FIG. 5 and the latter a section taken along a transverse center line therein, in which when the longitudinaly and transversely movable knives are moved from the position where they are illustrated by solid lines to the position of phantom lines or vice versa, each pointed tip of said knives can not reach the sheet at the ridges XR, XR; $XR_1$, $XR_2$ as well as YR, YR' and YR'' so that waste portion is cut off from the articles in one piece.

In addition, each of said ridges YR, YR', YR", XR$_1$ and XR$_2$ are engaged with a concerned rib member mounted beside the concerned knife and extended in parallel to the direction of the knife movement so as to assure correct trimming.

Since the upwardly protruded ridges XR, XR' (FIG. 8) are gripped by clamps 10 as shown in FIG. 4, the articles (I) and (II) respectively cut off from the sheet b are to fall down by gravity to be collected. If the waste plastic sheet portion surrounding said articles is not in one piece some waste pieces fall down together with said articles, which causes troublesome manual work for collecting said waste pieces to be recycled to the extruder.

Figure 9:
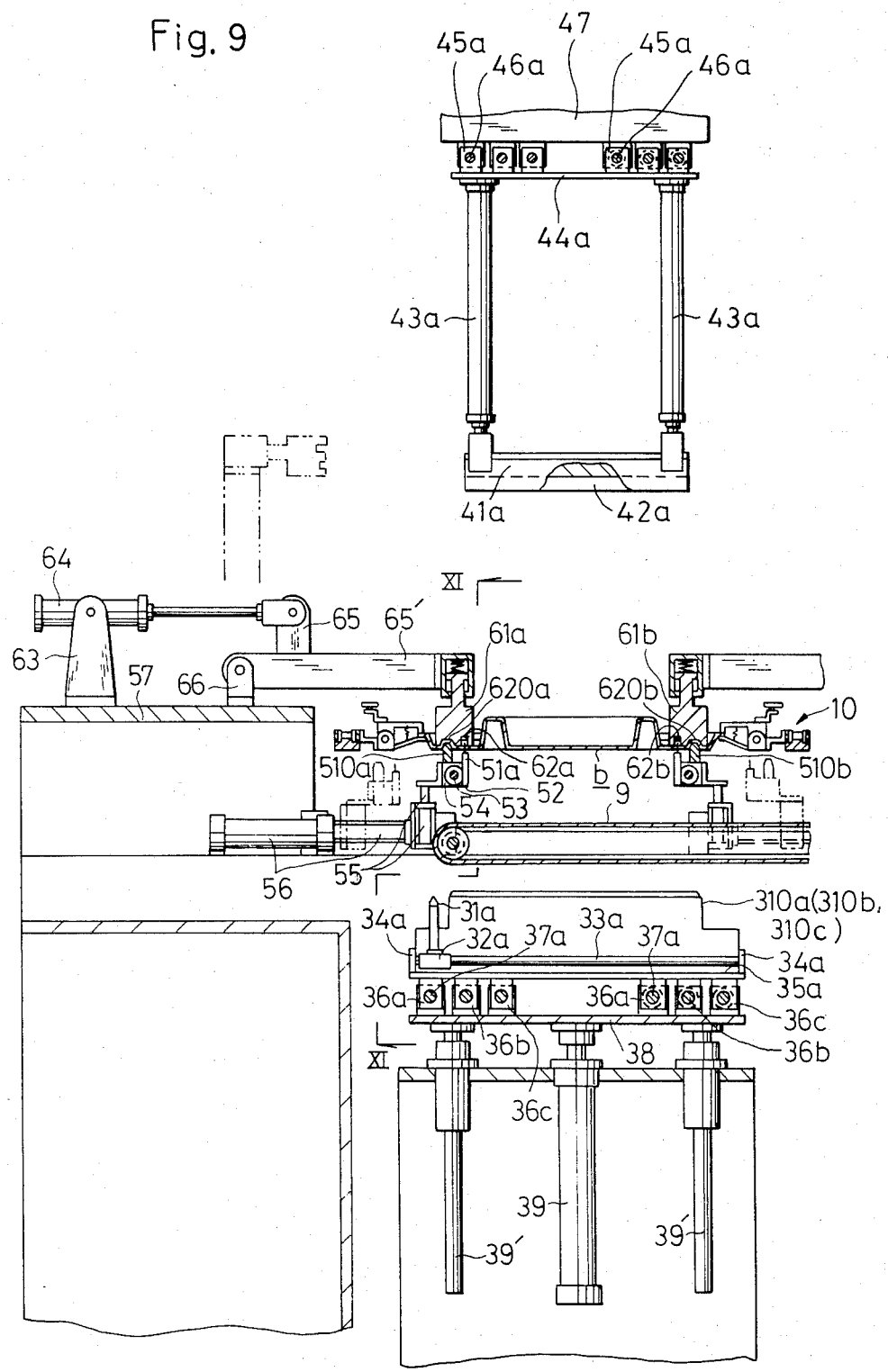
FIG. 9 is a front plan view partly in section of the main portion of the trimming device of the invention, in which the longitudinally movable knives are shown in forwarded position for severing but the transversely movable knives are shown in retracted position.

Now in reference to FIG. 9, there is shown a plastic sheet b formed with the article C(II) and upwardly bent ridges XR, XR'; XR$_1$, XR$_2$ as shown in FIG. 8 in the center of the right side therein. The sheet b is gripped by means of clamps 10, 10 at the opposite side edges XR, XR$_1$.

Figure 6:
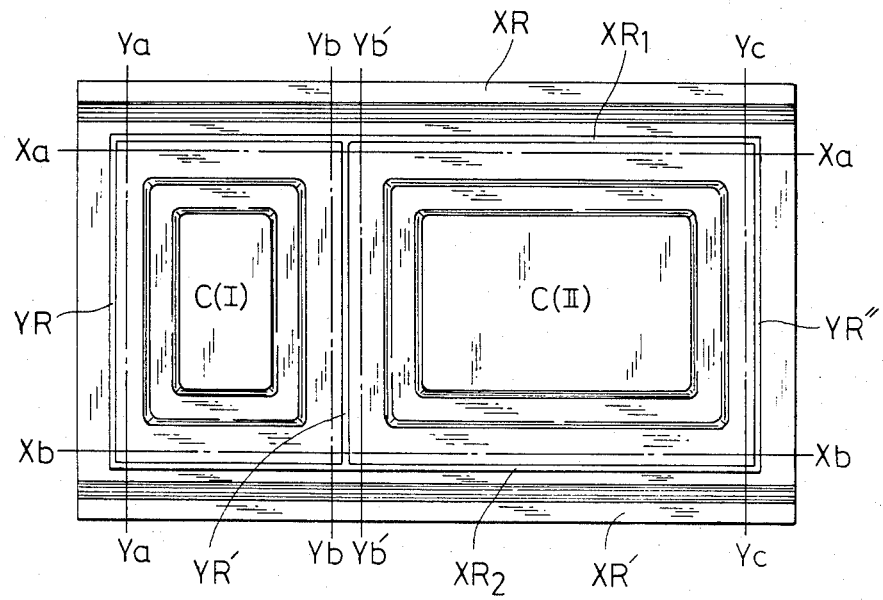
FIG. 6 is a top plan view of the above.

Beneath said sheet b, there are provided transversely movable knives 31a (31b, 31b', 31c) for severing said sheet b respectively along transverse lines Ya (Yb, Yb', Yc) as well as transversely extended upwardly protruded rib members 310a (310b, 310c) for engaging with ridges YR (YR', YR") to stably hold the sheet shown in FIG. 6 in retracted position as well as concerned mechanisms for moving said knife 31a between said retracted position and forwarded position which is the raised position in this embodiment, for driving said knife 31a transversely and in parallel with said rib 310 to sever and for shifting said knife longitudinally to adjust the distance therefrom to the adjacent knife 31b.

Above said sheet b, there is provided a transversely extended holder member 41a (41b, 41c) formed with extended channel 42a (42b, 42b', 42c) in the bottom thereof in retracted position as well as concerned mechanisms for moving said holder member 41a between said retracted position and forwarded position which is lowered position in this embodiment to cooperate with the forwarded counterpart knife 31a for effectively severing and for shifting said holder member 41a to adjust the distance therefrom to the adjacent holder member 41b.

Said holder member 41a (41b, 41c) is further formed with an extended channel 420a (420b, 420c) in parallel to said channel 42a (42b, 42c) so as to cooperate with the extended rib member 310a (310b, 310c) to grip the ridge of the sheet therebetween.

There is shown an endless belt conveyor 9 between the plastic sheet b and the transversely movable knife 31a, by which the formed articles separated from the sheet are received to be transversely taken out of the trimming apparatus. More detailed explanation shall be made later.

There are shown longitudinally movable transversely shiftable knives 51a and 51b as well as longitudinally extended upwardly protruded rib members 510a and 510b longitudinally extended transversly shiftable holder members 61a and 61b respectively in forwarded position so that each pointed tip of said knives 51a, 51b may longitudinally sever the sheet b with aid of said holder members 61a 61b respectively having longitudinally extended grooves 62, 62b as well as longitudinally extended grooves 620a, 620b for receiving ridges XR$_1$, XR$_2$ formed in the bottom thereof.

The concerned mechanisms for moving said knife 51a to longitudinally sever the sheet b with aid of said rib member 510a and transversely shifting said knife 51a together with said rib member 510a to adjust the position thereof in the transverse direction as well as for moving the longitudinally extended holder member 61a between retracted position and forwarded position and transversely shifting said holder member 61a to adjust the position in the trasverse direction are shown in the left side of FIG. 9.

The concerned mechanisms for the knife 51b as well as the rib member 510b and the counter part holder member 61b are just same with the above so that illustration is omitted in this figure.

Figure 10:
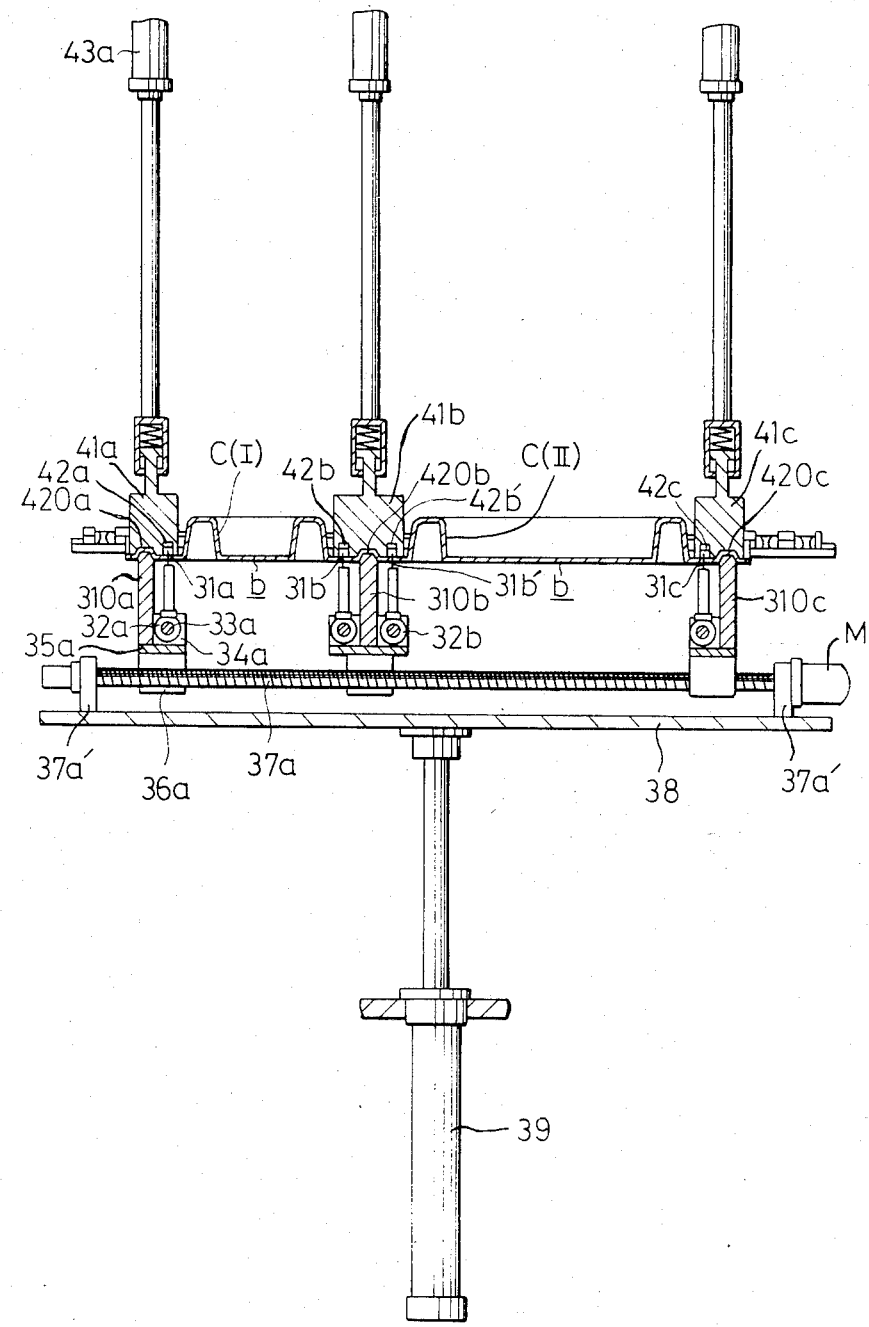
FIG. 10 is, a side elevation of the transversely movable knives in the forwarded position and concerned portions of the severing apparatus

Now with reference also to FIG. 10 which shows transversely movable longitudinally shiftable knives 31a, 31b, 31b' and 31c respectively together with the concerned rib member 310a, 310b and 310c as well as transversely extended longtidinally shiftable holder members 41a, 41b and 41c respectively in forwarded position for severing, seen in the direction normal to that of FIG. 9, arrangement and operation thereof shall be explained in more detail with respect to the knife 31a combined with the rib member 310a and the holder member 41a as well as concerned mechanism which can be applied as it is to other knives and holder members as well as concerned mechanisms therefor.

The pointed tip knife 31a is exchangeably mounted on a rodless cylinder 32a which is mounted on a transversely extended guide bar 33a to be pneumatically or hydraulically slidingly moved therealong. Concerned members for pneumatic or hydraulic movement are omitted for the sake of clarification of the drawing. Of course it may be driven by any other means. Said bar 33a is held by a frame comprising a pair of end flanges 34a, 34a and a base 35a transversely extended therebetween. On the base 35a there is mounted an upwardly protruded rib member 310a beside the knife 31a and extended in parallel with the moving direction thereof.

Under said base 35a there are fixedly provided a pair of block members 36a, 36a each having a threaded groove so as to threadedly engage with a longitudinally extending screw rod 37a. When a pair of screw rods 37a, 37a are synchronizedly rotated by means of a prime mover such as a reversible electric motor M, the assembly comprising the pointed tip knife 31a and the rib member 310a may be longitudinally shifted in either direction for position adjustment. In FIG. 9 there are shown two pairs of block members 36a, 36b; 36c, 36c in addition to said pair of block members 36a, 36a. Said longitudinally extended screw rod 37a is supported by a pair of flanges 37a', 37a' which are fixed on a base plate 38.

The base plate 38 may support not only the assembly comprising the knife 31a as well as the rib member 310a but also those for the knives 31b, 31b' and 31c as well as the rib members 310b and 310c as grand assembly. Said plate 38 is supported by a hydraulic piston-cylinder device represented generally by 39 so as to move the knives assembly from the retracted position illustrated in FIG. 9 to the forwarded position shown in FIG. 10. It is preferably to provide guide means 39', 39' as shown in FIG. 9 for ensuring stable vertical movement.

It is added that the knives 31b and 31b' as well as the rib member 310 common thereto are mounted on a single common cylinder 32b in this embodiment as shown in FIG. 10.

Said holder member 41a having the transversly extended channels 42a and 420a is held by the respective lower ends of the pistons of a pair of hydraulic piston-cylinder devices represented by 43a, 43a. It is preferable to provide spring means therebetween as shown in FIG. 10 in order to ensure reliable engagement of the holder member 41a with the pointed tip of the counterpart knife 31a and mild contact thereof on the plastic sheet b. When actuating said hydraulic piston-cylinder device 43a, the holder member 41a may be forwarded or lowered from the position shown in FIG. 9 to that shown in FIG. 10 so as to engage with the free end of the rib member 310a and the pointed tip of the knife 31a respectively in the channels 420a and 42a with holding the sheet b therebetween.

There is provided a transversely extended bar 44a between and on the upper ends of pair of cylinders 43a, 43a. On said bar 44a there are mounted a pair of block members 45a, 45a, each has a threaded bore so as to engage with each of a pair of longitudinally extended screw rods 46a, 46a which are not shown in FIG. 10. Not shown end brackets between which said screw rod is extended are fixed to a machine frame 47. By rotating said screw rods 45a, 45a, position of the holder member 41a is longitudinally adjusted in any direction similar to the position adjustment mentioned above regarding the knife 31a combined with the rib member 310a.

Figure 11:
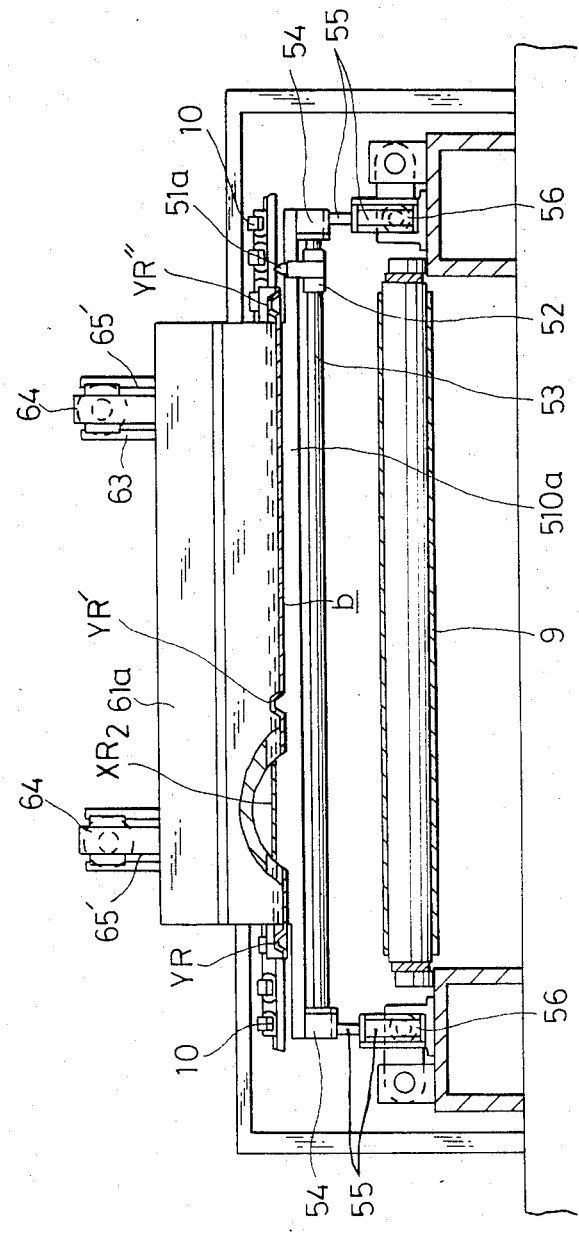
FIG. 11 is a side elevation seen in a line XI—XI and arrows shown in FIG. 9.

Now in reference also to FIG. 11 which is taken along a line XI—XI in FIG. 9 and seen in the direction shown by arrows, mechanisms for longitudinally movable transversely shiftable knife 51a (51b) as well as the rib members 510a (510b) and longitudinally extended transversely shiftable holder member 61a (61b) shall be explained in more detail.

Different from the transversely movable knife 31a (31b, 31b', 31c) for transversely severing of the plastic sheet b and transversely extended rib member 310a (310b, 310c) for assuring correct severing by engaging with the transversely extended ridge of the sheet, the assembly of said knives and said rib members being vertically movable between the forwarded severing position and the retracted waiting position, the longitudinally movable knife 51a (51b) for longitudinally severing of the plastic sheet b and the longitudinally extended rib member 510a (510b) for assuring correct severing by engaging with the longitudinally extended ridges of the sheet must be transversely moved between the forwarded severing position and the retracted waiting position and also transversely shifted for adjustment of the transverse position. Said assembly comprising the knife 51a (51b) and the rib member 510a (510b) must be further vertically moved a little in order to engage with and disengage from the ridge of the sheet.

The pointed tip knife 51a is exchangeably mounted on a rodless cylinder 52 which is pneumatically or hydraulically slidingly movable along a longitudinally extended guide bar 53 like as the pointed tip knife 31a. Said bar 53 is supported by longitudinally extended base 54 on which an upwardly protruded and longitudinally extended rib member 510a is mounted. Said assembly is fixed to a piston-cylinder device 55 vertically arranged which is mounted to another piston-cylinder device 56 horizontally arranged so that said assembly of the knife 51a and the rib member 510a may be lowered and transversely (to the left in FIG. 9) retracted in this embodiment. The same shall be applied also to the knife 51b and the rib member 510b.

As to the upper holder member 61a (61b), there are provided a pair of upwardly projecting flanges 63 on the machine frame, each having the cylinder of a cylinder-piston hydraulic device 64 pivotally mounted thereon so that when actuating said hydraulic device 64 this device may angularly be moved. The free end of the piston rod of said hydraulic device is pivotally mounted with an arm 65 which is fixed to another arm 65' of which one end is pivoted at an upwardly projecting flange 66 which is fixed on the roof of said frame member 57. said longitudinally extended holder member is fixed with the respective free ends of said pair of arms 65', 65' so that when actuating said hydraulic device 64 said longitudinally extended holder member 61a is angularly moved from the illustrated position to the retracted position shown in phantom lines in FIG. 9 or vice versa. It goes without saying that adjustment of the transverse position of said holder member may be made by the hydraulic cylinder-piston device 59' concurrently with adjustment of the knife 51a, since said holder member 61a is involved in one piece assembly so far as transverse movement is concerned.

What is claimed is:

1. An apparatus for trimming a plastic sheet on which articles are moldingly formed with longitudinally and transversely extended ridges around the articles, comprising a plurality of first sets of assemblies, each of said first sets of assemblies comprising a first knife, an upwardly protruded and longitudinally extended first rib member, first support means for supporting said first knife and said first rib member, first drive means for longitudinally driving said knife parallel to said first rib member, and first adjusting means for adjusting the position of said first support means in a transverse direction; a plurality of second sets of assemblies, each of said second sets of assemblies comprising a second knife, an upwardly protruded and transversely extended second rib member, second support means for supporting said second knife and said second rib member, second drive means for transversely driving said second knife parallel to said second rib member and second adjusting means for adjusting the position of said second support means in a longitudinal direction; a pair of endless link chains each having a plurality of chains for gripping side edges of said plastic sheet; first movable means for vertically moving said first sets of assemblies between a raised position where the first knives engage the plastic sheet and the longitudinally extended first rib members fit in the longitudinally extended ridge of the plastic sheet and a lowered position such that when said first movable means is in said raised position, said first knives sever said plastic sheet in a longitudinal direction; and second movable means for vertically moving said second sets of assemblies between a raised position where the second knives engage the plastic sheet and the transversely extended second extended rib members fit in the transversely extended ridges of the plastic sheet and a lowered retracted position such that when said second movable means is in said raised position, said second knives sever said plastic sheet in a transverse direction.

2. A trimming apparatus as claimed in claim 1, further comprising a plurality of first holder assemblies, each of said first holder assemblies comprising a longitudinally extended first holder member formed with a pair of first extended grooves in the lower surface thereof and first holder adjusting means for adjusting the position of said first holder member in a transverse direction; a plurality of second holder assemblies, each of said second holder assemblies comprising a transversely extended second holder member formed with a pair of second extended grooves in the lower surface thereof and second holder adjusting means for adjusting the position of said second holder member in a longitudinal direction; first holder movable means for vertically and horizontally moving said first holder assemblies between a lowered and forwarded holding position and a raised and retracted position such that when in said holding position, said first knife and said first rib member are accommodated respectively in said pair of first extended grooves; and second holder movable means for vertically moving said second holder assemblies between a lowered holding position and a raised retracted position such that when in said holding position, said second knife and said second rib member are accommodated respectively in said pair of second extended grooves.

* * * * *